Figure 1:
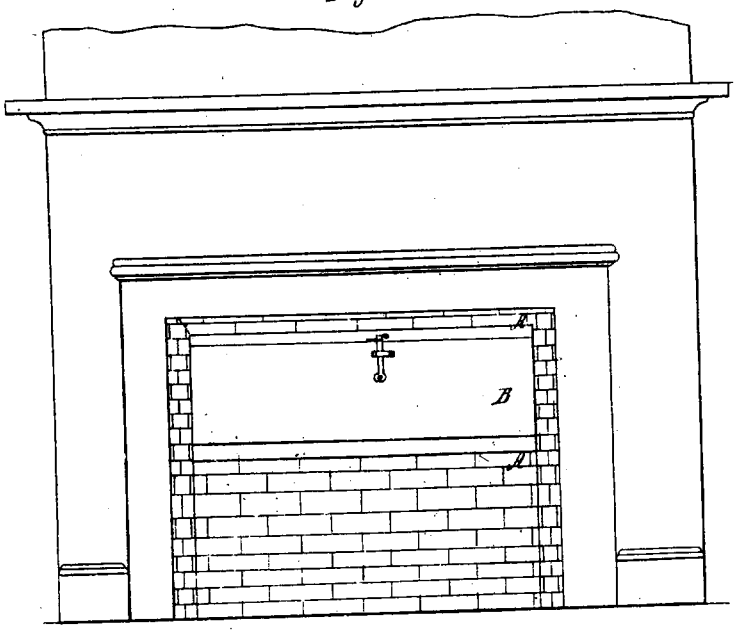
Figure 2:
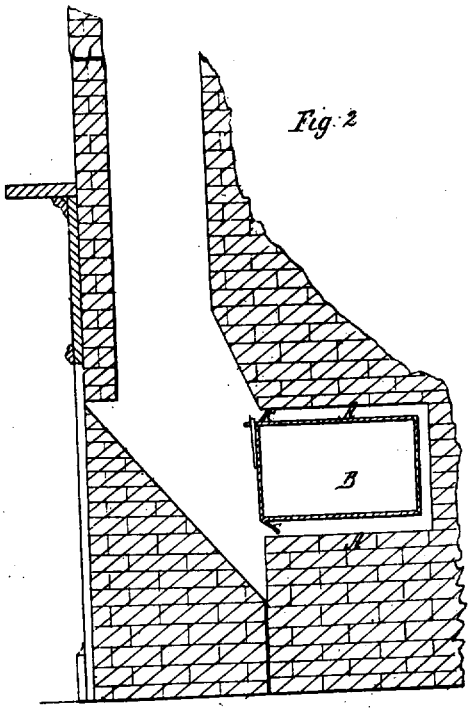
Figure 3:
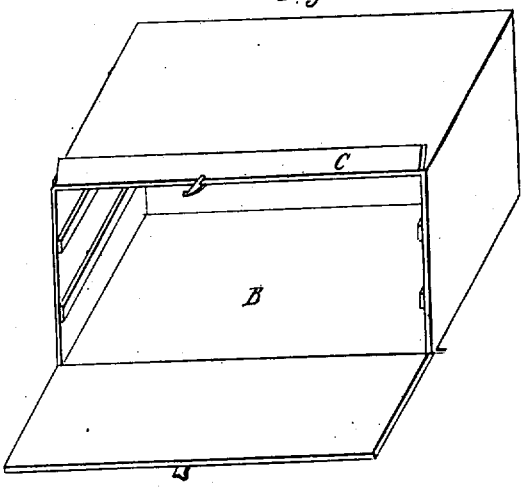

8532X

S. S. Eaton.

Domestic Oven.

Patented Dec. 17, 1834.

THE NORRIS PETERS CO., WASHINGTON, D. C.

Samuel S. Eaton, of Mansfield, Connecticut.

Letters Patent. 8532X

The schedule referred to in these Letters Patent and making part of the same containing a description in the words of the said Samuel S. Eaton himself of his improvement in Ovens —

To all to whom these presents shall come,

Be it known that I Samuel S. Eaton, of Mansfield in the County of Tolland and State of Connecticut, have invented a new and useful improvement on Ovens, and that the following is a full and exact description thereof viz. Section first. In forming the common or ordinary fire place, there should be constructed in the back of the same a cavity of the following size; twenty four inches in length, fourteen inches in depth, and sixteen inches in height, with a projection at each corner of said cavity at top, bottom and rear of each end, to be two inches thick, and to extend three inches from the right and left end of said cavity towards the center which will form a cavity or nitch in the wall to receive the oven to be described in section second, the size of which can be varied, according to the size of the fire place, into which the same may be designed to be placed.

Section Second. The oven to be composed of cast or wrought iron, tin, copper or other materials, to be made in the form of a box, twenty four inches long, twelve inches in depth, and twelve inches in height, with a door in front, attached to the lower plates of said oven, with hinges, with handle, latch, and catch, to open to the front to receive the articles to be baked. This oven will just fill the cavity described in section first, and leave an opening from the lower part of the oven in front, to its rear, and out at top of said oven, of eighteen inches long and two inches in width around the oven, which form a flue for the blaze or heat of the common fire to pass, to heat the oven and pass of in the regular flue of the chimney. To be varied in size as the demand of the applicant for the oven shall require.

Section Third. The oven to be moveable to front and rear to regulate the heat thereof by compelling the flames to pass the flue around the oven, and the oven door to open down in front its compelle all the heat and smoke to
pass in rear of oven to give a free accefs to the oven's mouth, without obstructio
of fire and smoke.

Section fourth, The oven may have attached to the upper and lower plates
in front two flanges or flaps secured with hinges by which the flue that passes
in rear of the oven may be wholly excluded when the oven is not to be used
and not requiring heat.

Section fifth. What I claim as my own invention, and not previously know
in the above improvement described on ovens, is the application to common
and ordinary fire places, to obtain heat without any additional expence
of fuel or labour to create a fire, dated at Windham November 20. 183[illegible]

Witnefses
Saml W. White
John B. Hosmer

Samuel S. Eaton.

640 n8

Ex^d
Ch^d W.

Drawing